BERND ROSS
*INVENTOR.*

BY
HIS ATTORNEY

United States Patent Office 3,227,876
Patented Jan. 4, 1966

3,227,876
NEUTRON DETECTING SOLID STATE DEVICE OR THE LIKE
Bernd Ross, Chicago, Ill., assignor to Hoffman Electronics Corporation, a corporation of California
Filed Dec. 3, 1956, Ser. No. 625,789
8 Claims. (Cl. 250—83.1)

The present invention relates to radiation detection devices and, more particularly, to a solid state device for the detection and measurement of neutron radiation.

The prior art has demonstrated that alpha particles may be readily detected by a p-n junction in a germanium semiconductor. An alpha particle incident upon the semiconductor passes through it and leaves behind broken valence bonds and ionized atoms. The ionized atoms or charge carriers, which have thus been made available for conduction, diffuse into the p-n junction region and are swept or pulled across the p-n junction by the electric field inherent in the junction. The result of the movement of the charge carrier across the p-n junction is a current pulse having an amplitude substantially proportional to the energy of the initiating alpha particle. Thus, the ionizing particle is detected as a current pulse. Experiments have demonstrated that the proportionality factor is accurate at least between 0.5 and 9 mev. (million electron volts).

Detection of neutrons, rather than alpha particles, is complicated by the fact that the neutron does not normally ionize so as to produce charge carriers, but the neutron must first be caused to enter into a nuclear reaction in order to cause ionization.

Therefore, it is one of the objects of the present invention to provide a solid state device for detecting the presence of neutron radiation.

An additional object of the present invention is the provision of a solid state device to permit the measurement or counting of the amount of neutron radiation present.

Another object is the provision of a simple and inexpensive method for making a unitary device for detecting neutron radiation.

A further object is to provide a solid state device for converting nuclear energy into electrical energy.

Another object of this invention is the combination of a solid state device with an hydrogenous material whereby fast neutron radiation may be detected and measured.

According to the present invention, a semiconductor having a p-n junction therein is provided with a layer of material containing an isotope with a substantial absorption cross-section. In one embodiment of this invention, a silicon semiconductor having a p-n junction is provided with a layer of enriched boron[10], boron[10] being an isotope which has a very high absorption cross-section for slow neutrons. An incident neutron entering the boron layer encounters a boron[10] atom and enters into a nuclear reaction which causes ionization of silicon to produce ion pairs which diffuse into and out of the junction region and thereby give rise to a current pulse. The semiconductor is provided with electrodes for coupling the current pulse to well-known indicator means, such as an amplifier followed by an oscilloscope or scale meter.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings, in which:

Figure 1:
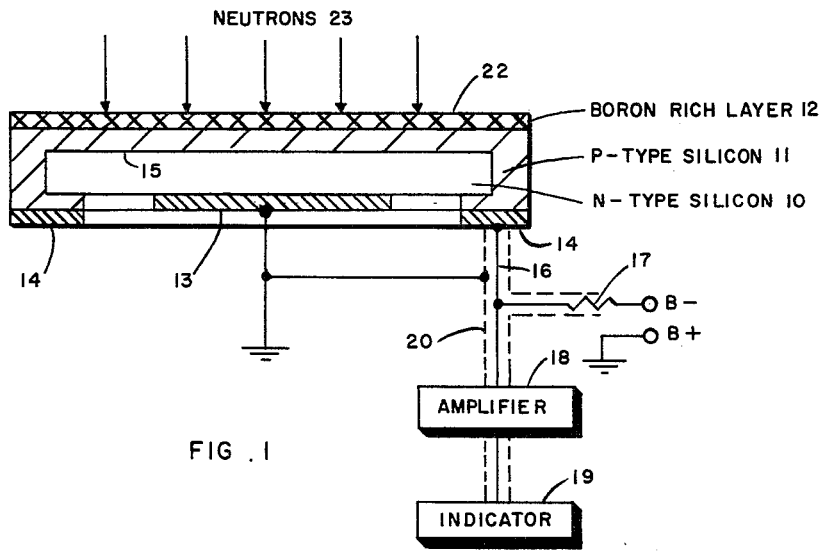
FIGURE 1 is a diagrammatic representation of a device and associated circuitry in accordance with the present invention.
Figure 3:
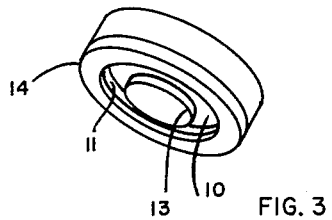
FIGURE 3 is a bottom perspective view of the embodiment of FIGURE 1.

Referring to FIGURES 1 and 3, there is seen an n-type silicon wafer 10 covered, at least on its upper surface, by a p-type silicon layer 11. A layer of boron-rich material 12 covers the upper surface of the p-type silicon layer 11. Electrodes 13 and 14 make ohmic contact to the under surfaces of the n-type silicon wafer 10 and the p-type silicon layer 11, respectively. The combination of silicon wafer 10 and layer 11 forms a p-n junction 15. Lead 16 connects the electrode 14 to input resistor 17 and the amplifer 18. Resistor 17 is connected to a B— potential source and the amplifier 18 is connected to an indicator 19. The lead 16 is protected by a grounded shield 20 from stray effects. The electrode 13 is connected to ground, as is the B+ terminal of the power supply.

Figure 2:
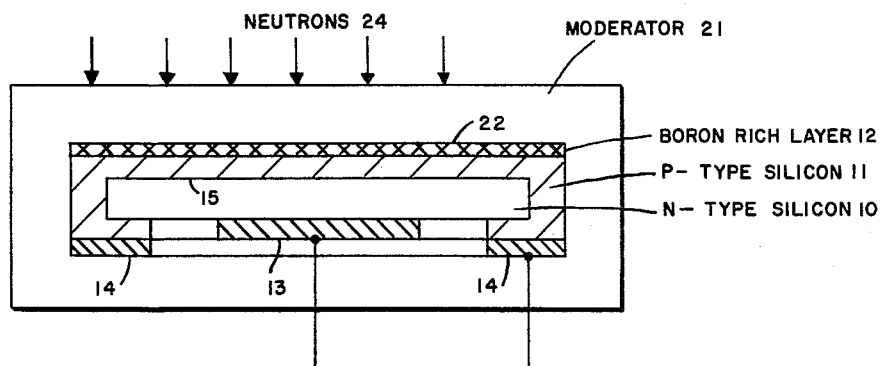
FIGURE 2 is a view of the device of FIGURE 1 with a moderator casing for use in detection of fast neutrons.

Referring to FIGURE 2, the device of FIGURE 1 is shown to be completely encased by a moderator 21, which may be composed of paraffin, polyethylene, or some other hydrogen-rich material. The electrodes 13 and 14 are connected to indicator means (not shown) such as in FIGURE 1.

Although the portions of the unitary device are indicated in the drawing as being sharply separated by straight lines, it should be understood that such indications are for convenience of illustration only, as boundaries of the portions usually will be diffused regions.

One manner of constructing the disclosed device may be described as follows. An n-type silicon wafer is disposed in a furnace heated to about 1100° C. Then a gas or vapor composed of boron trichloride ($BCl_3$), diluted with nitrogen, is allowed to pass over the silicon. A chemical reaction takes place, the $BCl_3$ decomposing at the silicon surface with a gas silicon tetrachloride ($SiCl_4$) passing off. The elemental boron which is then left as a deposit on the silicon, forming the boron-rich layer, is partially diffused into the n-type silicon to form a p-type silicon layer with a p-n junction therebetween. The resulting structure is substantially as shown in FIGURE 1, with a p-type silicon layer enclosing an n-type silicon wafer, and a non-conductive boron-rich layer thereon. The foregoing process is partly known in the art for making photovoltaic and other semiconductors, but the present process includes the exposure of the silicon wafer to the boron trichloride gas for a much longer period than is usually the case in making such semiconductors. The time of exposure of the n-type silicon wafer to the boron trichloride gas is so chosen as to cause a relatively thick layer of boron to be deposited. The under sruface of the device is then prepared according to well known processes so as to permit the ohmic contact to be made. For the present device, the boron-rich material is maintained upon the upper surface of the device; in photovoltaic or other semiconductor uses, the upper surface would also be etched or otherwise prepared so as to remove the non-conductive layer.

Various alternative methods may be employed within the scope of the present invention. For example, a boron-rich layer may be applied to an n-type wafer portion in a non-diffusion manner, in either a solid state or as a relatively low-temperature vapor, and then heated to a high temperature to partially diffuse the boron into the n-type portion to create a p-type portion between the boron-rich layer and the n-type portion. Another method may include applying a boron-rich layer to a semiconductor having therein an already existing p-n junction.

In operation of the present device, the upper surface 22 will be disposed substantially facing the source of radiation of neutrons 23. An incident slow neutron will encounter a boron[10] atom and enter into the following nuclear reaction:

$$_0n^1 + _5B^{10} \to _5B^{11} \to _3Li^7 + _2He^4 + 2.5 \text{ mev.}$$

The reaction fragments, lithium and helium, recoiling with 2.5 mev. energy, will ionize the silicon in their path, resulting in the production of approximately 100,000 ion pairs. The electrons and holes will diffuse into the junction region 15 and give rise to a current pulse which will be detected by the indicator. The B— voltage is impressed across the p-n junction and has a value just below the Zener reference level to increase the sensitivity of the device.

The boron used in the gas, which is allowed to pass over the silicon in the process of manufacturing, may be natural boron which contains approximately 20% of the boron[10] isotope, or may be enriched boron[10] (having up to 96% boron[10]) which is available from special sources (e.g., Gillette, Isotopes Division, Oak Ridge National Laboratories, Oak Ridge, Tennessee). The boron-rich layer 12 may consist of the composition of approximately 53% boron, 17% silicon, 9% nitrogen, and 21% oxygen, determined by spectrographic analysis of one device embodying the present invention.

As should be noted, the boron layer may also serve as a diffusion source to obtain p-type silicon. In such case, the boron is diffused to a depth of approximately 0.005 centimeters. However, this diffusion does not adversely affect the concentration of boron at the surface 22. The line in which the junction meets the crystal surface is etched in the conventional manner, in order to obtain good reverse characteritsics. Thus, the device may be made more sensitive in operating at a high back voltage for two reasons. Firstly, the space-charge layer thickness is increased and the sweep-out region extends throughout a greater volume of silicon. This increases the sensitive volume of the counter. Secondly, the device may operate in proximity to the avalanche breakdown region and take advantage of charge multiplication.

Referring to FIGURE 3, the device of FIGURE 1 has been encapsulated by the moderator 21 so as to permit the detection of fast neutrons 24. Such fast neutrons will be slowed due to the absorption of energy by protons recoiling from the knock-on process which will occur in the hydrogenous material of the moderator. The moderator 21 needs only be a few centimeters thick.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A radiation detector comprising a semiconductor body having adjacent regions therein of different conductivity types, at least one of said regions containing therein a neutron-sensitive enriched material.

2. A radiation detector comprising a semiconductor body having a p-n junction betwen regions of p-type and n-type conductivity, at least one of said regions having a neutron-sensitive enriched material therein.

3. A neutron detecting device comprising a body of semiconductor material predominantly of one conductivity type, having on one surface a thick layer of conductivity-type modifying material which is reactive with neutrons to produce ionization in said semiconductor material; an interfacial portion only of said modifying material being diffused into said body to provide therein a p-n junction spaced from said layer.

4. A neutron detecting device in accordance with claim 3, in which said body is n-type silicon, and in which said modifying material comprises a substantial proportion of boron[10].

5. A neutron detecting device in accordance with claim 3, including a neutron-velocity moderating material covering at least one surface of the device.

6. The method of making a neutron detecting device, comprising depositing, on a body of semiconductor material of one conductivity type, a thick layer of a substance capable of producing ionization in said material upon neutron bombardment, said substance being chosen from the class of impurities capable of reversing the conductivity type of the semiconductor material; and thereafter diffusing a portion only of said substance into the body of said semiconductor material to form therein a p–n junction in charge-carrier receiving relation to the remaining undiffused portion of said substance.

7. The method in accordance with claim 6, in which said material is n-type silicon and in which said substance includes a substantial percetnage of boron[10].

8. The method in accordance with claim 6, including the step of etching the periphery of the interfacial boundary between the material and the layer.

References Cited by the Examiner
UNITED STATES PATENTS

| | | | |
|---|---|---|---|
| 2,556,768 | 6/1951 | McKibben | 313—61 |
| 2,725,315 | 11/1955 | Fuller | 148—1.5 |
| 2,753,462 | 7/1956 | Moyer et al. | 250—83.1 |
| 2,790,940 | 4/1957 | Prince | 148—1.5 X |
| 2,804,405 | 8/1957 | Derick et al. | 148—1.5 |
| 2,867,727 | 1/1959 | Welker et al. | 250—83.1 |
| 2,920,204 | 1/1960 | Youmans | 250—83.1 |
| 2,932,594 | 4/1960 | Mueller | 148—1.5 |

RALPH G. NILSON, *Primary Examiner.*

NORMAN H. EVANS, ARTHUR GAUSS, *Examiners.*